United States Patent
Yang

(10) Patent No.: US 6,630,979 B2
(45) Date of Patent: Oct. 7, 2003

(54) ELECTRODE ARRAY STRUCTURE OF IPS-LCD

(75) Inventor: Kie-Hsiung Yang, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 81 days.

(21) Appl. No.: 10/074,526

(22) Filed: Feb. 12, 2002

(65) Prior Publication Data
US 2002/0131006 A1 Sep. 19, 2002

Related U.S. Application Data

(63) Continuation-in-part of application No. 09/881,264, filed on Jun. 14, 2001.

(30) Foreign Application Priority Data

Mar. 16, 2001 (TW) .......................................... 90106221 A

(51) Int. Cl.⁷ ............................................. G02F 1/1343
(52) U.S. Cl. ...................................... 349/141; 349/146
(58) Field of Search .......................... 349/33, 136, 139, 349/141, 143, 145, 146

(56) References Cited

U.S. PATENT DOCUMENTS

| 5,745,207 A | * | 4/1998 | Asada et al. ................. 349/141 |
| 6,266,116 B1 | * | 7/2001 | Ohta et al. .................. 349/141 |
| 6,538,713 B1 | * | 3/2003 | Yanagawa et al. .......... 349/146 |

* cited by examiner

*Primary Examiner*—Toan Ton
*Assistant Examiner*—Tai Duong
(74) *Attorney, Agent, or Firm*—Thomas, Kayden, Horstemeyer & Risley

(57) ABSTRACT

An electrode array structure in a pixel area of an in-plane switching mode LCD (IPS-LCD). A comb-shaped common electrode has a bar extending transversely and a plurality of teeth extending in a first lengthwise direction from the bar, in which each tooth of the common electrode has a continuous ∠-shaped sidewall. A comb-shaped pixel electrode has a bar extending transversely and a plurality of teeth extending in a second lengthwise direction from the bar, in which each tooth has a continuous ∠-shaped sidewall and parallel is disposed between adjacent teeth of the common electrode. An electric-field gradient is generated between the tooth of the common electrode and the adjacent tooth of the pixel electrode to form a non-uniform electric field.

10 Claims, 4 Drawing Sheets

ELECTRODE ARRAY STRUCTURE OF IPS-LCD

This application is a continuation in part of Ser. No. 09/881,264 filed Jun. 14, 2001, pending.

BACKGROUND OF THE INVENTION

1. Field of the Invention

The present invention relates to an In-Plane Switching mode LCD (IPS-LCD) and, more particularly, to an electrode array structure of an IPS-LCD.

2. Description of the Related Art

Liquid crystal displays (LCDs) may be classified by the orientation of the liquid crystal molecules between the spaced apart substrates. In a conventional twisted nematic LCD (TN-LCD), the liquid crystal molecules are twisted between the two substrates. In contrast, in an in-plane switching mode LCD (IPS-LCD), common electrodes and pixel electrodes are formed on a lower glass substrate (TFT substrate) and an in-plane electric field therebetween is generated to rearrange the liquid crystal molecules along the in-plane electric field. Accordingly, the IPS-LCD has been used or suggested for improving viewing angle, contrast ratio and color shift.

In the IPS-LCD, the display characteristics of the view angle with respect to the invert luminance are superior. However, as shown in FIG. 1, when the liquid crystal molecules 1 are rotated to an angle 45° with respect to the in-plane electric field, the observed image from the direction crossing at 45 degrees or 135 degrees against the lengthwise direction of the common electrodes 2 and the pixel electrodes 3 is colored blue or yellow. This is a problem to be solved in the image quality of the IPS-LCD.

Seeking to solve the coloring phenomenon, a herringbone-shaped electrode structure is developed for modifying the rotating angle of the liquid crystal molecules. As shown in FIG. 2, in the conventional IPS-LCD, a TFT substrate 10 has a plurality of parallel data lines 12 extending along Y-axis and a plurality of parallel gate lines 14 extending along X-axis, which are arranged in a manner to form a matrix of pixel areas 24. Also, a comb-shaped pixel electrode 18 and a herringbone-shaped common electrode 20 are disposed in each pixel area 24, and at least one TFT device 16 is disposed at a cross point of the data line 12 and the gate line 14. In addition, an orientation layer (not shown) is spread on the entire surface of the TFT substrate 10, and the orientation layer is rubbed in a direction shown by arrow A so as to make liquid crystal molecules 22 arrange along the direction A before an external voltage is applied to the TFT substrate 10.

The comb-shaped pixel electrode 18 has a bar 18a transversely disposed over the gate line 14 to form a capacitor, and a plurality of continuous saw-toothed teeth 18b, 18c extending along Y-axis from the bar 18a. The herringbone-shaped common electrode 20 has a center wiring portion 20a extending along X-axis, and a plurality of saw-toothed bones 20b, 20c bent at the center wiring portion 20a and respectively extending along a first Y-axis and a second Y-axis. For example, the bones 20b extending along the first Y-axis are parallel to the teeth 18b, 18c and the bones 20b arrange at intervals between the teeth 18b, 18c.

When external voltage is applied to the TFT substrate 10, an in-plane electric field is formed between the bones 20a, 20b and the teeth 18b, 18c, resulting in a rotation of the liquid crystal molecules 22 toward the in-plane electric field. Using the center wiring portion 20a of the common electrode 20 as the discrimination, the pixel area 24 is divided into a first sub-pixel area 241 and a second sub-pixel area 242, and the liquid crystal molecules 22a and 22b positioned adjacent to the center wiring portion 20a respectively rotate in counterclockwise direction and in clockwise direction. In the first sub-pixel area 241, since the bones 20b, 20c and the teeth 18b, 18c have the same saw-toothed sidewalls, the liquid crystal molecules 22a and 22a' positioned adjacent to the tip of the saw-toothed sidewall respectively rotate in counterclockwise direction and in clockwise direction. Therefore, two domains are formed within the first sub-pixel area 241. Similarly, the liquid crystal molecules 22b and 22b' also form two domains within the second sub-pixel area 242. Furthermore, the saw-toothed sidewalls lead to a specific tilted degree of the in-plane electric field which corresponds to the rotation angle of the major axes of the liquid crystal molecules 22. It is preferable that the rotation angle θ of the liquid crystal molecules 22 satisfy the formula 0°<θ≦+60° or −60°≦θ<0° to solve the coloring phenomenon.

However, the liquid crystal molecules 22 positioned at the peaks of the saw-toothed sidewall, that is, the parting of the two domains of the sub-pixel area, are jostled by surrounding molecules 22 that rotate in a different direction, thus the liquid crystal molecules 22 on the parting of the two domains are stopped from rotating. Due to both the stopped rotation and the common electrode 20 and the pixel electrode 20 non-transparent nature, the liquid crystal molecules 22 positioned at the peaks of the saw-toothed sidewall present as dark lines after voltage is applied to the TFT substrate 10, as shown by dotted lies I—I and II—II. This decreases the aperture ratio of the IPS-LCD. Especially when the number of peaks of the saw-toothed sidewall is increased, the number of dark lines is correspondingly increased and thereby the aperture ratio is further decreased. Thus, a novel electrode array structure of the IPS-LCD eliminating the aforementioned problems is called for.

SUMMARY OF THE INVENTION

The present invention provides an electrode array structure to modify the rotation angle of the liquid crystal molecules, and achieve increased aperture ration and decreased driving voltage.

An electrode array structure in a pixel area of an in-plane switching mode LCD (IPS-LCD). A comb-shaped common electrode has a bar extending transversely and a plurality of teeth extending in a first lengthwise direction from the bar, in which each tooth of the common electrode has a continuous ∠-shaped sidewall. A comb-shaped pixel electrode has a bar extending transversely and a plurality of teeth extending in a second lengthwise direction from the bar, in which each tooth has a continuous ∠-shaped sidewall and parallel is disposed between adjacent teeth of the common electrode. An electric-field gradient is generated between the tooth of the common electrode and the adjacent tooth of the pixel electrode to form a non-uniform electric field.

Accordingly, it is a principle object of the invention to provide the ∠-shaped sidewall of the electrode to modify the rotation angle of liquid crystal molecules.

It is another object of the invention to make the rotation angle θ of the liquid crystal molecules satisfy the formula 0°<θ≦+60° or −60°≦θ<0°.

Yet another object of the invention is to solve the coloring phenomenon.

It is a further object of the invention to increase the aperture ratio of the IPS-LCD.

Still another object of the invention is to provide an electric-field gradient between the tooth of the common electrode and the adjacent tooth of the pixel electrode to form a non-uniform electric field.

It is a further object of the invention to reduce the starting voltage, the driving voltage and the switching time of the IPS-LCD.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

[First Embodiment]

Figure 1:
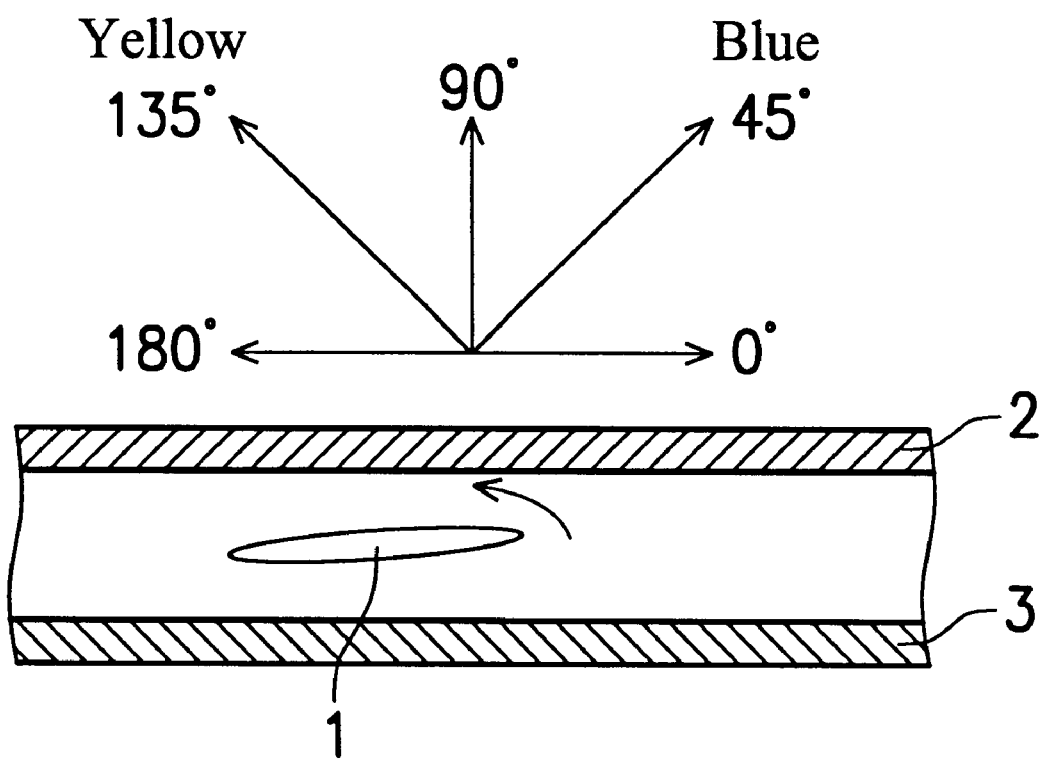
FIG. 1 is a top view showing the coloring image corresponding to the view angle.
Figure 2:
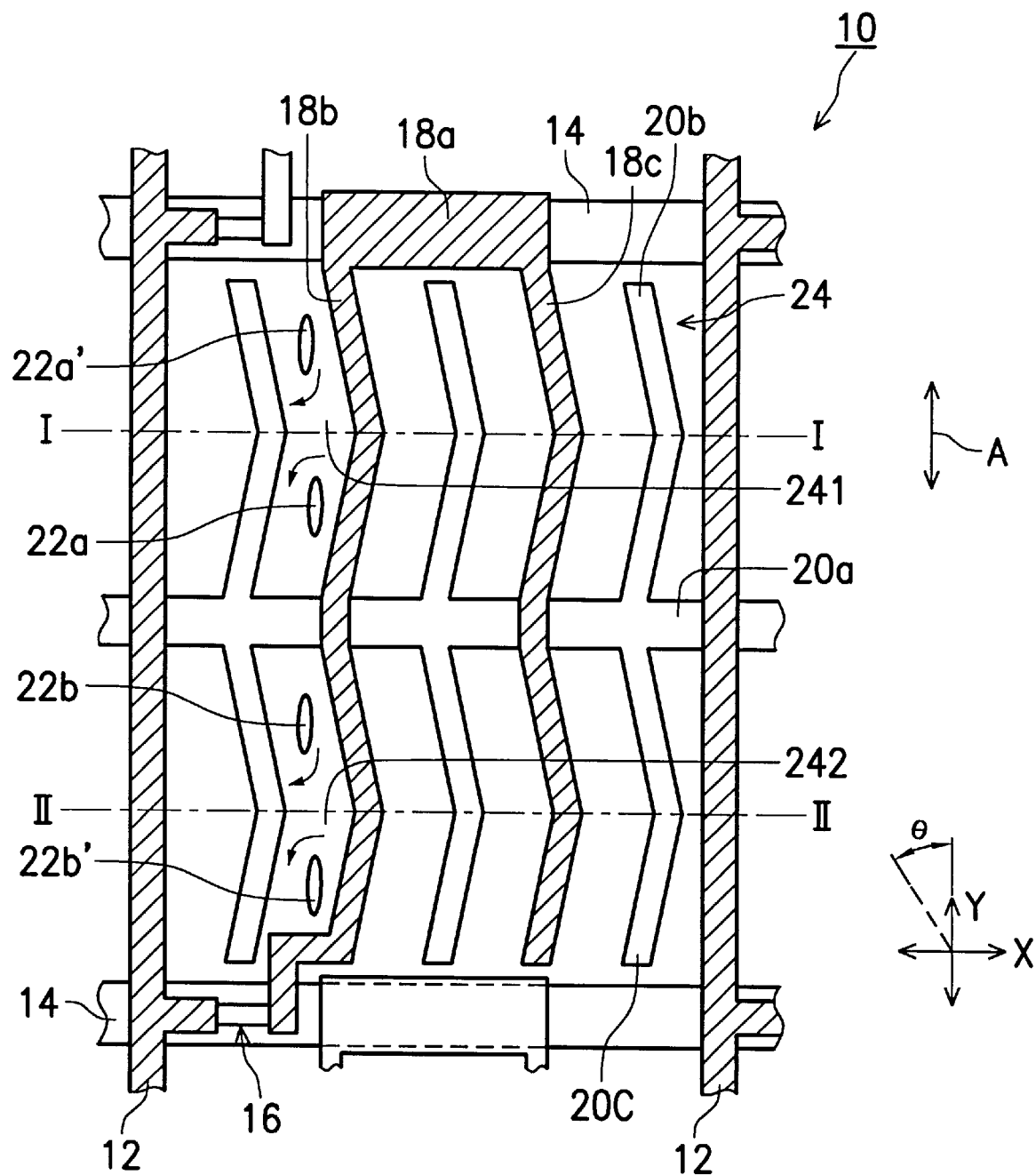
FIG. 2 is a top view showing the electrode array structure of a conventional IPS-LCD.
Figure 3A:
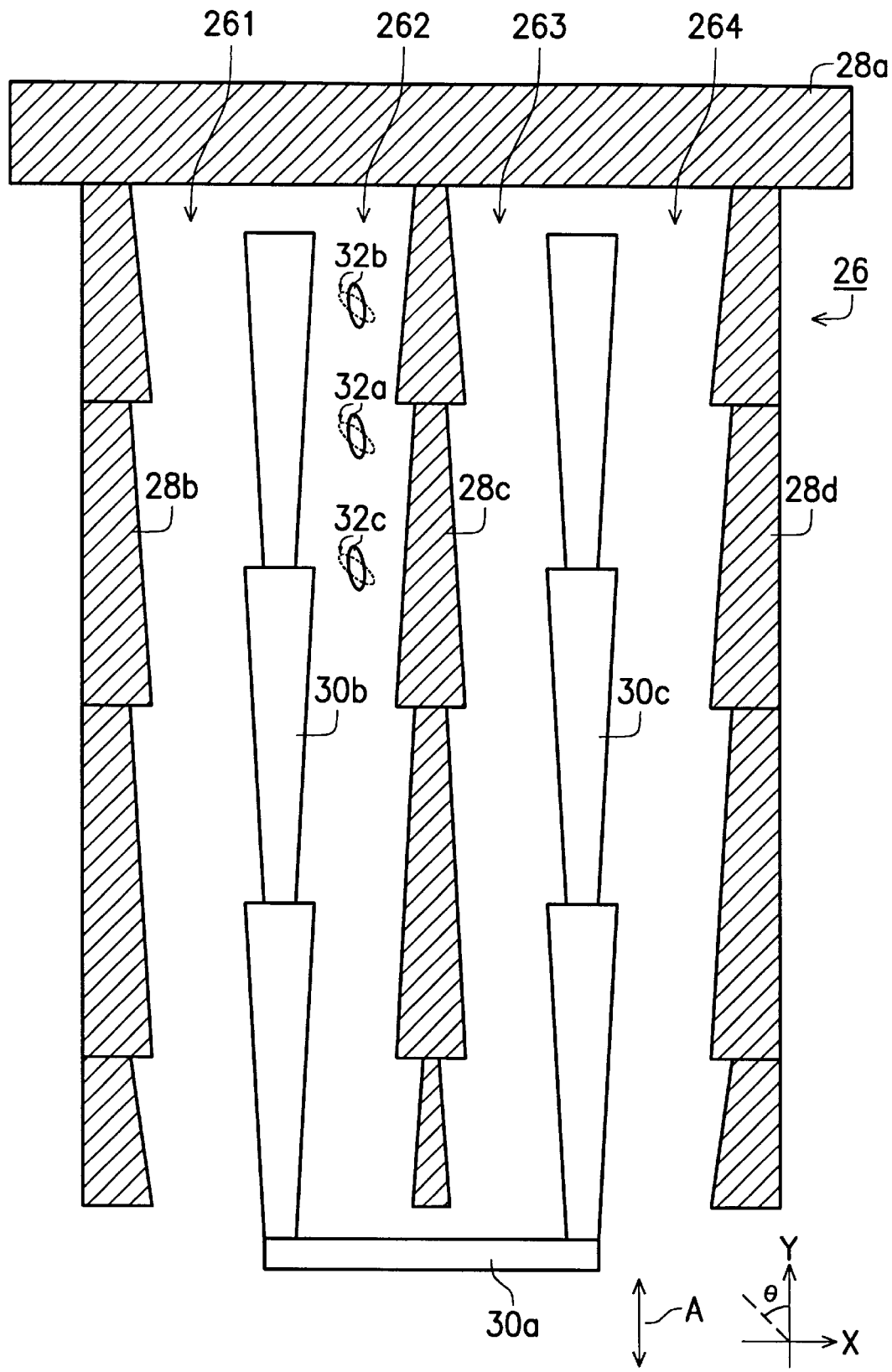
FIG. 3A is a top view showing an electrode array structure of IPS-LCD according to the first embodiment of the present invention.

FIG. 3A is a top view showing an electrode array structure of IPS-LCD according to the first embodiment of the present invention. In a pixel area 26, a comb-shaped common electrode 28 has a bar 28a and three teeth 28b, 28c, 28d, and a comb-shaped pixel electrode 30 has a bar 30a and two teeth 30b, 30c. Since the two teeth 30b, 30c are arranged at intervals among the three teeth 28b, 28c, 28d, the pixel area 26 is divided into four sub-pixel areas 261, 262, 263, 264. Before a voltage is applied to the IPS-LCD, liquid crystal molecules 32 align along a rubbed direction shown by arrow A, thus the major axes of the liquid crystal molecules 32 is parallel to the teeth 28b, 28c, 28d of the common electrode 28. After applying the voltage to the IPS-LCD, an in-plane electric field is formed between the teeth 28b, 28c, 28d of the common electrode 28 and the teeth 30b, 30c of the pixel electrode 30, and then the liquid crystal molecules 32 rotate toward the in-plane electric field.

Each tooth 28b, 28c, 28d of the common electrode 28 is formed by lengthwise linking of a plurality of trapezoids to present a continuous ∠-shaped sidewall, presenting a Christmas tree-like-like profile. Each tooth 30b, 30c of the pixel electrode 30 is formed by lengthwise linking of a plurality of inverted trapezoids, presenting an inverted Christmas tree-like-like profile. Because the continuous ∠-shaped sidewalls lead to a specific tilted degree of the in-plane electric field which corresponds to the rotation angle of the major axes of the liquid crystal molecules 32, the rotation angle θ of the liquid crystal molecules 32 satisfies the preferred formula 0°<θ+60° or −60° θ<0° to solve the coloring phenomenon.

Moreover, the number of trapezoids in each of the teeth 28b, 28c, 28d of the common electrode 28 is not equal to the number of inverted trapezoids in each of the teeth 30b, 30c of the pixel electrode 30. For example, one inverted trapezoid in the teeth 30b of the pixel electrode 30 is adjacent two trapezoids in the teeth 28b of the common electrode 28. Thus, the transverse distance between the tooth 30b of the pixel electrode 30 and the tooth 28b common electrode 28 is different along lengthwise direction, resulting in a non-uniform electric field.

In the second sub-pixel area 262, when an external voltage is applied, the smallest transverse distance exists between the point of the ∠-shaped tooth 28c and the sidewall of the tooth 30b, thus the highest electric field is generated near the point of the ∠-shaped tooth 28c. Also, the largest transverse distance exists between the parallel sidewalls of the tooth 28c and the tooth 30b, thus the lowest electric field is generated away from the point of the ∠-shaped profile. Since the differentiation of electric field to space is not zero, called an electric-field gradient, there is a non-uniform electric field existing in the second sub-pixel area 262. When the external voltage is increased to reach a predetermined value that is smaller than the driving voltage, the liquid crystal molecule 32a arranged at the larger electric field can start to rotate, and the liquid crystal molecule 32b or 32c arranged at the smaller electric field keeps still. Thereafter, as the external voltage is continuously increased to increase the rotating angle of the liquid crystal molecule 32a, elastic distorted energy is generated and transported upward to the liquid crystal molecule 32b or downward to the liquid crystal molecule 32c. Thereby, the combination of the elastic distorted energy and the low electric field can make the liquid crystal molecules 32b and 32c rotate. Preferably, the rotating angle θ of the liquid crystal molecule is 0°<θ<20°. Compared with the prior art of using uniform electric field in each sub-pixel area, the non-uniform electric field in the sub-pixel area 262 can reduce the starting voltage, the driving voltage and the switching time of the IPS-LCD.

[Second Embodiment]

Figure 3B:
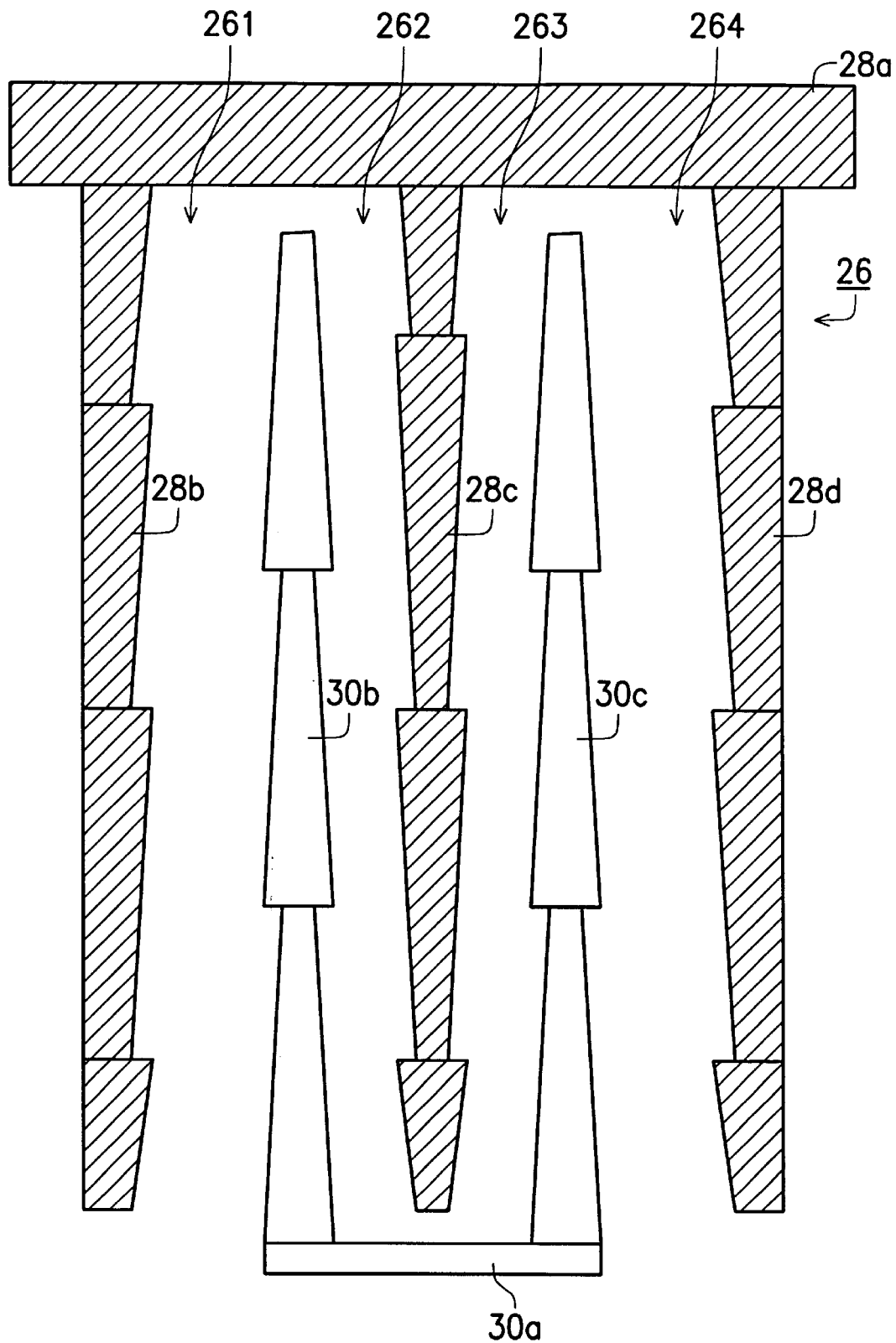
FIG. 3B is a top view showing an electrode array structure of IPS-LCD according to the first embodiment of the present invention.

FIG. 3B is a top view showing an electrode array structure of IPS-LCD according to the second embodiment of the present invention. Each tooth 28b, 28c, 28d of the common electrode 28 is formed by lengthwise linking of a plurality of inverted trapezoids to present a continuous ∠-shaped sidewall, presenting a Christmas tree-like-like profile. Each tooth 30b, 30c of the pixel electrode 30 is formed by lengthwise linking of a plurality of trapezoids, presenting an inverted Christmas tree-like-like profile. One trapezoid in the teeth 30b of the pixel electrode 30 can be adjacent more than two inverted trapezoids in the teeth 28b of the common electrode 28.

It is to be understood that the present invention is not limited to the embodiments described above, but encompasses any and all embodiments within the scope of the following claims.

What is claimed is:

1. An electrode array structure in a pixel area of an in-plane switching mode LCD (IPS-LCD), comprising:

a comb-shaped common electrode having a bar extending transversely and a plurality of teeth extending in a first lengthwise direction from the bar, wherein each tooth of the common electrode has a continuous ∠-shaped sidewall; and a comb-shaped pixel electrode having a bar extending transversely and a plurality of teeth extending in a second lengthwise direction from the bar, wherein each tooth has a continuous ∠-shaped sidewall and parallel is disposed between adjacent teeth of the common electrode;

wherein, an electric-field gradient is generated between the tooth of the common electrode and the adjacent tooth of the pixel electrode to form a non-uniform electric field.

2. The electrode array structure according to claim 1, wherein each tooth of the pixel electrode is adjacent to each tooth of the common electrode.

3. The electrode array structure according to claim 1, wherein each tooth of the common electrode is formed by lengthwise linking of a plurality of trapezoids, and each tooth of the pixel electrode is formed by lengthwise linking of a plurality of inverted trapezoids.

4. The electrode array structure according to claim 3, wherein two adjacent trapezoids are connected by a rectangular strip, and two adjacent inverted trapezoids are connected by a rectangular strip.

5. The electrode array structure according to claim 3, wherein the number of trapezoids in each tooth of the common electrode is not equal to the number of inverted trapezoids in each tooth of the pixel electrode.

6. The electrode array structure according to claim 3, wherein the rotating angle of a liquid crystal molecule arranged between the tooth of the common electrode and the adjacent tooth of the pixel electrode is between 0° and 20°.

7. The electrode array structure according to claim 1, wherein each tooth of the common electrode is formed by lengthwise linking of a plurality of inverted trapezoids, and each tooth of the pixel electrode is formed by lengthwise linking of a plurality of trapezoids.

8. The electrode array structure according to claim 7, wherein two adjacent trapezoids are connected by a rectangular strip, and two adjacent inverted trapezoids are connected by a rectangular strip.

9. The electrode array structure according to claim 7, wherein the number of inverted trapezoids in each tooth of the common electrode is not equal to the number of trapezoids in each tooth of the pixel electrode.

10. The electrode array structure according to claim 7, wherein the rotating angle of a liquid crystal molecule arranged between the tooth of the common electrode and the adjacent tooth of the pixel electrode is between 0° and 20°.

* * * * *